May 15, 1951     K. C. KAUER ET AL     2,552,562
METHOD OF MAKING BENZENE HEXACHLORIDE
Filed Sept. 6, 1946
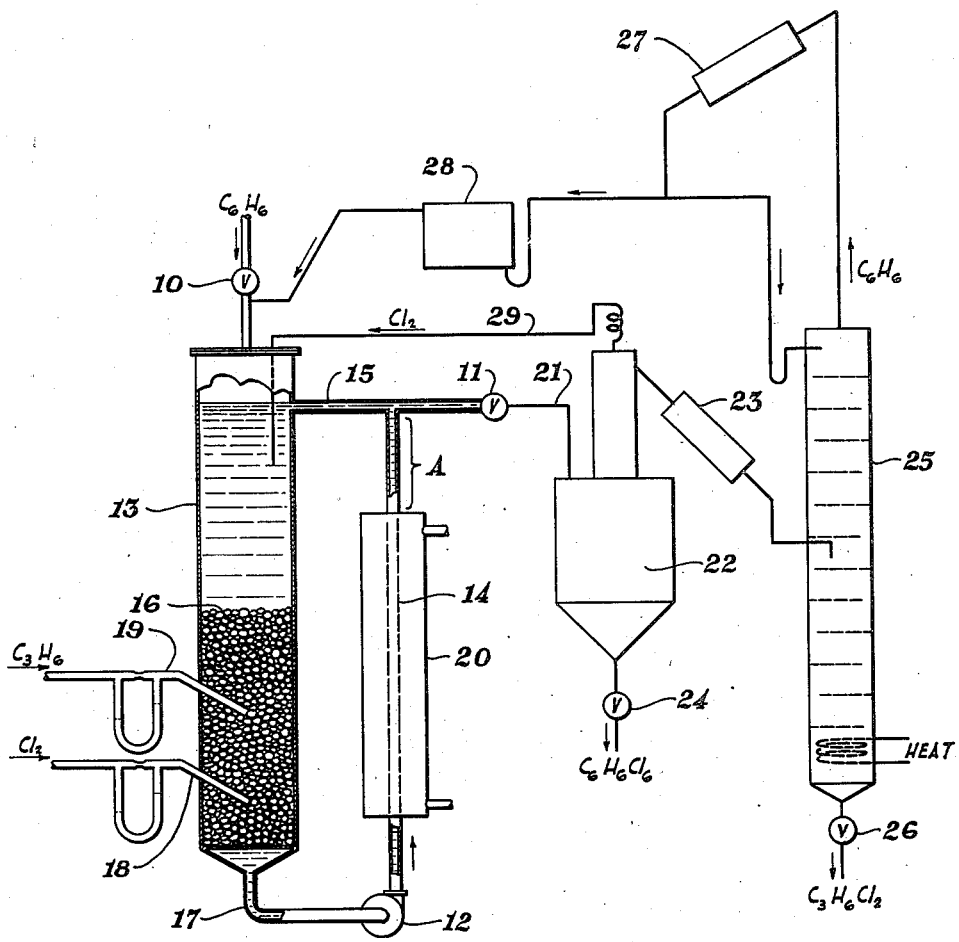
INVENTORS
Kenneth C. Kauer
Francis N. Alquist
BY Edgar C. Britton
Griswold & Burdick
ATTORNEYS Patented May 15, 1951

2,552,562

UNITED STATES PATENT OFFICE 2,552,562

METHOD OF MAKING BENZENE HEXACHLORIDE

Kenneth C. Kauer, Francis N. Alquist, and Edgar C. Britton, Midland, Mich., assignors to The Dow Chemical Company, Midland, Mich., a corporation of Delaware Application September 6, 1946, Serial No. 695,238

4 Claims. (Cl. 260—648)

This invention relates to a method for the production of benzene hexachloride, also known as hexachlorocyclohexane, $C_6H_6Cl_6$. It relates in particular to a commerically practical process for making this compound in the dark, i. e. without need for actinic radiations. It is especially concerned with such a method, the product of which is consistently rich in the gamma-isomer of benzene hexachloride.

Various methods of making benzene hexachloride are known in the art. These include the substitution chlorination of cyclohexane and the addition chlorination of benzene. The latter is generally conceded to be the more practical reaction. In common practice the process is one of photocatalysis, employing mercury vapor lamps, direct sunlight, or other sources of actinic radiation as a catalyst for the chlorination reaction. If such a process can be avoided, many operating difficulties will be overcome. Among these is the tendency for the product to separate from the reaction medium as a solid, in the reactor. Some few suggestions have been made to employ chemical catalysts, and to effect the chlorination in dark equipment. Thus, various metal chlorides, dilute sodium hydroxide, water and dissolved ethylene have all been suggested as catalysts. It has also been disclosed to pass pure, dry benzene vapors and dry chlorine over a reduced copper catalyst, to produce benzene hexachloride. Another prior process involves the treatment of benzene with liquid chlorine. Some of these methods are commercially impractical. Some of them form mixed addition and substitution products. Others appear to give a product with a very low ratio of the gamma-isomer to the other isomers present, as the marketed product contains sometimes as little as 2–4 per cent. A practical process, yielding consistently high proportions of the insecticidally valuable gamma-isomer, is much to be desired.

It is accordingly among the objects of the present invention to provide a practical and economical process for the preparation of benzene hexachloride. A related object is to provide such a process from which the product contains consistently from 10 to 15 per cent of gammabenzene hexachloride. A further object is to provide a process as aforesaid, capable of being operated in the dark, and in a continuous manner. Another object is to provide such a process, in which the benzene hexachloride remains dissolved in the reaction medium to a practical high concentration, and does not separate as solid in the reactor.

We have now found a method whereby the foregoing and related objects may be attained. The new method comprises mixing liquid benzene with from 6 to 7 per cent or more of its weight of chlorine in the presence of small amounts of propylene, and allowing this mixture to react at a temperature between 5° and the boiling point of benzene, more economically not above 60° C., and preferably one between 35° and 45° C., withdrawing the resulting solution from the reaction zone before the benzene hexachloride produced exceeds a concentration of about 18 per cent in the solution, and recovering benzene hexachloride from its solution in benzene and propylene chloride. The reaction is most conveniently carried out in the dark, but is not adversely affected by diffused light or by actinic radiations. In its most practical form, the method of the invention is a continuous one, and may be carried out in the manner hereinafter described in detail.

We are aware of the publication by Stewart and Hanson, Journal of the American Chemical Society, vol. 53, page 1121 (1931), in which mention is made of the production of benzene hexachloride when a solution of chlorine in benzene is mixed with a solution of ethylene in benzene. We have found, however, that ethylene is not a satisfactory initiator for the commercial production of benzene hexachloride, for several reasons. For example, the resultant mixture of benzene and ethylene chloride is a much poorer solvent for benzene hexachloride than is benzene alone, or than a mixture of benzene and propylene chloride. Further, because of the small difference between the boiling points of benzene and ethylene chloride, these materials cannot be separated by commercially feasible distillation technics. Accordingly, when attempting to use ethylene as the catalyst for the present reaction, it has been found that the ethylene chloride concentration continues to build up, even in cyclic systems, and the solubility of benzene hexachloride in the reaction mixture continues to decrease correspondingly, making it impossible to achieve a practical rate of reaction without encountering precipitation of solid benzene hexachloride and all of the operating difficulties inherent in such a two-phase mixture.

In view of the marked advantages of propylene over ethylene as an initiator for the present reaction, attempts have been made to use butylene and other olefinic compounds, but without success. Butene-1, for example, when substituted for propylene in the reaction mixture, produced only 42 per cent as much benzene hexachloride per unit weight of chlorine input, as did propylene, and the product obtained contained from one-third to one-half the proportion of gamma-isomer which is consistently obtained by the method of this invention. Such other unsaturates as vinyl chloride, perchlorethylene, and butadiene do not catalyze the reaction, and neither do the olefine chlorides, such as ethylene chloride and propylene chloride.

When operating according to the present invention, it is found that there is an initial "induction period," during which little if any benzene hexachloride is produced. During this period the chlorine concentration builds up in the system to between 6 and 7 per cent by weight at temperatures near 40° C. Somewhat higher concentrations are obtained at lower temperatures. The chain reaction induced by the propylene then starts rather suddenly, with evolution of considerable heat, and the rate of chlorine input may be stepped up to provide enough chlorine for the accelerated reaction and to maintain a saturated condition in the benzene. Under these conditions, some chlorine passes through the system unchanged, but the maintenance of such a condition is fully justified by the greater rate of reaction which it induces. The passed chlorine may be recycled, if desired. The duration of the induction period and the vigor of the reaction both vary inversely as the temperature, other factors being equal. Thus, if the temperature in the reactor is kept between 5° and 15° C., the induction period is somewhat longer, and the reaction, when started, is more vigorous, than when the temperature is between 35° and 45° C. At the lower end of the operative temperature range, very efficient control must be maintained on the chlorine supply and on the means for extracting the suddenly liberated heat of reaction. A slight advantage is found in operating at 5° to 15° C., in the somewhat higher ratio of the gamma- to the other isomers, but the reaction is much more readily controllable, and a consistently high yield of gamma-benzene hexachloride is obtained at temperatures which range up to 60° C., but which are preferably between 35° and 45° C.

After initiation of the reaction, it is not necessary to maintain a flow of propylene at the initial rate, as a very low molar ratio of propylene to chlorine appears to sustain the reaction, and the propylene may even be shut off for a time without injurious effect on the yield or efficiency of the reaction. The ratio of propylene to chlorine may, but need not exceed 1 mol of the former for each 6 mols of the latter in the early stages of the reaction, and improved results are obtained in settled operation using a molar ratio in the range between 1:8 and 1:10. Ratios as low as 1:20 may be used.

Having now described the process in general terms and given some of the preferred conditions of operation, a more detailed description will be given with reference to the accompanying drawing, wherein the single figure is a diagrammatic representation of an elevation of one form of apparatus for the continuous production of benzene hexachloride according to the new method.

Commercially dry benzene is introduced into the apparatus through valve 10 until it starts to overflow through valve 11, which is then closed. Pump 12 is started, causing circulation of the benzene downward through tower 13 and upward through reaction tube 14, the cycle being completed through pipe 15. Tower 13 may be at least partially filled with packing rings 16, if desired. Chlorine and propylene are introduced in measured amounts into the circulating liquid 17 through separate inlet tubes 18 and 19, respectively, which are preferably located near the bottom of tower 13, to ensure complete absorption of the gases in the liquid. A portion of the cycle, and preferably pipe 14, is surrounded with a water jacket 20, for adjusting the temperature of the circulating mixture. When the reaction has started, and sufficient chlorine has been introduced to provide an amount, preferably near 15 to 17 per cent concentration, of benzene hexachloride in the circulating liquid, valves 10 and 11 are each opened sufficiently to bleed some of the reaction mixture continuously thereafter through pipe 21 into kettle 22, and to replace that volume of liquid with fresh benzene. Kettle 22 represents a still from which benzene and propylene chloride may be taken off in the overhead, and condensed as by condenser 23, and from which the benzene hexachloride may be withdrawn periodically, as through valve 24. The mixture of benzene and propylene chloride may be separated, as in a stripper tower 25, the propylene chloride being drawn off at the bottom through valve 26, while the benzene is vaporized and passes to condenser 27, from which a part is returned to tower 25 as reflux and a part is returned to the reaction system, through drier 28, if necessary. Absolute dryness of the benzene is not required, but a separate water phase should be avoided in the reaction zone, for best results. If desired, when an excess of chlorine is passing through the system, it may be separated from the mixture of benzene and propylene chloride, and returned to tower 13 through pipe 29. If desired, pump 12 may be omitted, and natural circulation may be relied upon. In such case the cyclic flow is opposite to that shown in the drawing.

The reaction is most conveniently carried out, and is most readily controlled in the dark, i. e. when run in nickel or other light-impervious metal which is not a catalyst for the substitution chlorination of benzene, or in ceramics or darkened or wrapped glass apparatus. If it is desired to increase somewhat the possible rate of chlorine input, it is permissible to irradiate the reaction mixture in a portion of its cycle. This may be done conveniently through a section of glass pipe inserted, for example, in the section marked "A."

It is to be understood that many other forms of apparatus may be employed instead of the one shown, and that the process is capable of being run batchwise or in a semi-continuous manner, instead of in the continuous manner described above.

The method of the invention produces a benzene hexachloride containing consistently from 10 to 15 per cent of the gamma-isomer, and usually about 13–14 per cent of this insecticidally active material, as well as a predominant amount of the alpha-isomer and lesser amounts of the beta-, delta-, and epsilon-isomers, with traces of others as yet unidentified. The various isomers present and their respective amounts are most readily determined by infra-red analysis from calibrations made with the pure isomers.

The following examples illustrate the practice of the invention, but are not to be construed as limiting the same to the specific conditions described:

Example 1

In an operation carried out in accordance with the present invention, 2140 parts of benzene, by weight, including the initial charge, was fed into and circulated in a reaction zone over the course of 11 hours, with vigorous agitation in the reaction zone. During this time there was fed into the reactor 1643 parts by weight of chlorine and 155 parts by weight (3.7 mols) of propylene. The ratio of propylene to chlorine, on a molar basis, was 1 to 6.25. The reaction temperature was held between 37° and 43° C. Product was withdrawn and fresh benzene introduced at a rate to maintain a single liquid phase in the reaction zone. Excess chlorine, in the amount of 203 parts by weight, passed through the reactor and was caught in a special cold trap. There was recovered from the reaction 1507 parts by weight of benzene hexachloride, containing 13.2 per cent of gamma-isomer. Allowing for the chlorine recovered and for that converted to propylene chloride, the reaction was 93 per cent efficient in producing benzene hexachloride. No significant substitution chlorination occurred, as the amount of hydrogen chloride evolved was only 0.35 part by weight.

Example 2

In order to compare the results obtained using propylene from different sources, and when omitting propylene from the reaction, a series of small scale runs were made in a painted and tinfoil-wrapped glass apparatus. The charge of benzene was the same in each case, and the duration of the run, the weight of chlorine and its rate of introduction, and the reaction temperature, were the same for all runs. The results are tabulated in the following table.

| Propylene, Quality [1] | Temperature, °C. | Benzene Hexachloride, Grams | Gamma-Isomer, Per Cent | Yield of Benzene Hexachloride, Mol Per Cent [2] |
|---|---|---|---|---|
| 90 | 37–44 | 221 | 12 | 100 |
| 90 | 37–44 | 226 | 13.2 | 100 |
| 100 | 36–43 | 130 | 15.7 | 95 |
| None | 37–42 | 18 | ------ | 8 |

[1] The "90 per cent" propylene was a cracked petroleum product containing 90.6 per cent propylene, 3.2 per cent propane, 1.2 per cent allene, 3.1 per cent methyl acetylene, 0.9 per cent ethane, 0.3 per cent carbon dioxide and 0.7 per cent hydrogen sulfide. The "100 per cent" propylene was from a cylinder of liquefied, pure material.
[2] In the runs using propylene, yield was calculated from the chlorine available after deducting recovered chlorine and chlorine equivalent to the propylene used, from total chlorine input.

All of the runs in which propylene was used gave practically theoretical yields of benzene hexachloride. The technical (90 per cent) propylene gave about 1.75 times as much benzene hexachloride as did the pure propylene, i. e. the rate of reaction was that much greater when technical propylene was used as the initiator, under the standard conditions employed. When no propylene was used, the yield of benzene hexachloride was negligible, and the rate of reaction was only 8 per cent of that when technical propylene was used as an initiator of the reaction.

Example 3

In a completely darkened glass tubular reaction apparatus, 390 parts by weight of benzene was treated in the course of 4 hours with 450 parts by weight of chlorine and 42 parts by weight of pure propylene (1 mol propylene to 6.3 mols chlorine). The temperature was initially 19° C., but rose to and was controlled at 30° C. when the reaction started after a short induction period. About 200 grams of the chlorine passed through the system unchanged, and was caught and liquefied in a refrigerated trap. There was obtained 210 grams of benzene hexachloride, having about 13 per cent of the gamma product. After allowing for the recovered chlorine and the chlorine converted to propylene chloride, the yield of benzene hexachloride was 86 per cent of the theoretical.

Other runs have shown it to be undesirable to have water present in a large enough quantity to form a separate liquid phase in the system. Thus, in two otherwise identical runs, both using propylene from the same source, when one was carried out with commercially dry benzene and the other with benzene containing 0.25 per cent more water than required to saturate the benzene, the "wet" reaction produced only 0.7 as much benzene hexachloride in a given length of time as did the "dry" reaction. The benzene hexachloride produced had, in both cases, between 13 and 14 per cent of gamma-isomer.

Example 4

A tubular reactor was constructed from two lengths of glass pipe 14 feet long and 4 inches in diameter, connected near each end by glass tubular cross-members one inch in diameter. Provision was made for the introduction of benzene at the top, and of chlorine and propylene near the bottom of one of the larger pipes, and the other was provided with externally applied cooling by means of flowing water. The glass reactor was painted black and was wrapped or shielded to exclude light. The system was filled with 100 pounds of benzene. Chlorine and 90 per cent propylene were bubbled into the benzene, and the liquid began to move upward in the uncooled leg and downward through the cooled leg of the cyclic system. The ratio of chlorine to benzene was about 6 to 8 mols of chlorine for each mol of propylene. The solution first assumed the yellow-green color of dissolved chlorine and began to show signs of reaction when the solution had become saturated with chlorine. The reaction temperature was controlled near 35° to 45° C., with occasional variations in the range from 30° to 50° C. The rate of chlorine input was adjusted so that about one-fourth of the chlorine passed through the system unreacted. This amount could have been, but was not, recycled. When 30 pounds of chlorine had been put into the system for each 100 pounds of benzene, the chlorine flow was discontinued and propylene flow was continued until the solution again was colorless. The solution was withdrawn from the reactor and was heated to drive benzene and propylene chloride from the benzene hexachloride. The recovered benzene hexachloride weighed about 22.5 pounds and contained about 13 per cent gamma-benzene hexachloride.

Similar runs in the same apparatus consistently produced a material containing from 10 to 15 per cent of the gamma-isomer. The chlorine employed in these runs, for each 30 pounds input, was distributed about as follows:

| Pounds Chlorine Input | Pounds Product |
|---|---|
| To benzene hexachloride, 16.5 | 22.5 |
| To propylene chloride, 6.0 | 9.4 |
| Unreacted, 7.5 | |

The reaction has been illustrated in the examples with respect to batch and semi-continuous operation, but is capable of being performed in a continuous manner, using any suitable means of separating the product from the benzene, and separating the benzene from the propylene chloride, and returning the benzene to the reaction zone. One such system is illustrated diagrammatically in the accompanying drawing, and has already been described.

We claim:

1. The method which comprises circulating benzene in a closed system, bubbling thereinto an amount of chlorine sufficient to keep the benzene saturated therewith and an amount of propylene sufficient to initiate and to maintain the addition reaction between benzene and chlorine, but not in excess of one mol of propylene for each 6 mols of chlorine, maintaining the temperature of the reaction between 35° and 45° C., to product benzene hexachloride, and continuously withdrawing part of the circulating solution from the system and replacing it with a similar volume of benzene, to prevent the concentration of benzene hexachloride from reaching the saturation point in the circulating liquid.

2. The method which comprises circulating benzene in a closed dark system, bubbling thereinto an amount of chlorine sufficient to keep the benzene saturated therewith and an amount of propylene sufficient to initiate and to maintain the addition reaction between benzene and chlorine, but not in excess of one mol of propylene for each 6 mols of chlorine, maintaining the temperature of the reaction between 35° and 45° C., to produce benzene hexachloride, and continuously withdrawing part of the circulating solution from the system and replacing it with a similar volume of benzene, to prevent the concentration of benzene hexachloride from reaching the saturation point in the circulating liquid.

3. The method as claimed in claim 1, wherein the benzene employed is dry.

4. The method as claimed in claim 2, wherein the benzene employed is dry.

KENNETH C. KAUER.
FRANCIS N. ALQUIST.
EDGAR C. BRITTON.

REFERENCES CITED

The following references are of record in the file of this patent:

FOREIGN PATENTS

| Number | Country | Date |
| --- | --- | --- |
| 447,058 | Great Britain | May 7, 1936 |

OTHER REFERENCES

Stewart et al., "Jour. Am. Chem. Soc.," vol. 53, pages 1121-8 (1931).